United States Patent [19]

Crall, Jr.

[11] Patent Number: 5,267,422
[45] Date of Patent: Dec. 7, 1993

[54] INSULATION CONTAINMENT APPARATUS

[76] Inventor: Theron L. Crall, Jr., P.O. Box 304, Oak Grove, Mo. 64075

[21] Appl. No.: 954,031

[22] Filed: Sep. 30, 1992

[51] Int. Cl.⁵ .............................................. E04B 1/74
[52] U.S. Cl. ...................................... 52/404; 220/520; 220/553; 206/524
[58] Field of Search ................. 52/404, 406; 206/524; 220/520, 553

[56] References Cited

U.S. PATENT DOCUMENTS

| | | |
|---|---|---|
| 3,160,987 | 12/1964 | Pinkley . |
| 3,415,073 | 12/1968 | Ammons . |
| 3,619,437 | 11/1971 | McDonald, Jr. . |
| 3,835,606 | 9/1974 | Liberman . |
| 3,841,479 | 10/1974 | Szatkowski ................. 206/524 |
| 4,079,553 | 3/1978 | Kirk . |
| 4,200,034 | 4/1980 | Listle et al. . |
| 4,237,671 | 12/1980 | Munson . |
| 4,237,672 | 12/1980 | Peterson . |
| 4,267,927 | 5/1981 | English, Jr. ................. 206/524 |
| 4,272,928 | 6/1981 | Schluter . |
| 4,276,730 | 7/1981 | Lewis . |
| 4,306,387 | 12/1981 | Hopkins . |
| 4,406,095 | 9/1983 | Slavik . |
| 4,446,661 | 5/1984 | Jonsson et al. . |
| 4,446,664 | 5/1984 | Harkins . |
| 4,513,545 | 4/1985 | Hopkins, Jr. . |
| 4,516,363 | 5/1985 | Beaulieu et al. . |
| 4,552,212 | 11/1985 | Nuttle . |
| 4,573,298 | 3/1986 | Harkins . |
| 4,582,042 | 4/1986 | Kubler . |
| 4,649,677 | 3/1987 | Oldham . |
| 4,724,651 | 2/1988 | Fligg . |
| 4,735,026 | 4/1988 | Forsythe . |
| 4,796,397 | 1/1989 | Capaul . |

Primary Examiner—Carl D. Friedman
Assistant Examiner—Creighton Smith
Attorney, Agent, or Firm—Litman, McMahon & Brown

[57] ABSTRACT

An insulation containment apparatus includes a pair of side panels and a plurality of spacer panels. The side panels are flexible and allow the apparatus to be compressed by accordianing for storage and transport. The apparatus is expanded to form a containment area between the side panels that is placed over a duct. The containment area is then filled with insulation to insulate the duct. Openings are provided in the spacer panels to receive the duct. Stakes are also provided to secure the apparatus in a particular location.

13 Claims, 2 Drawing Sheets

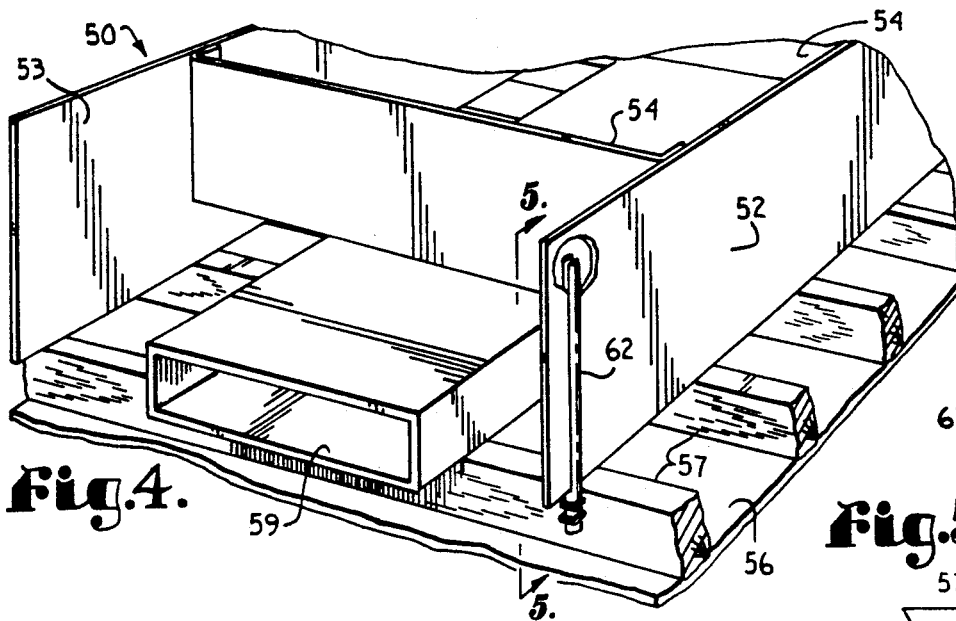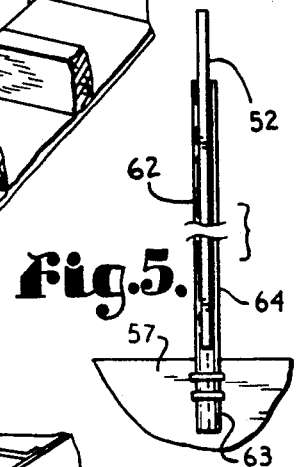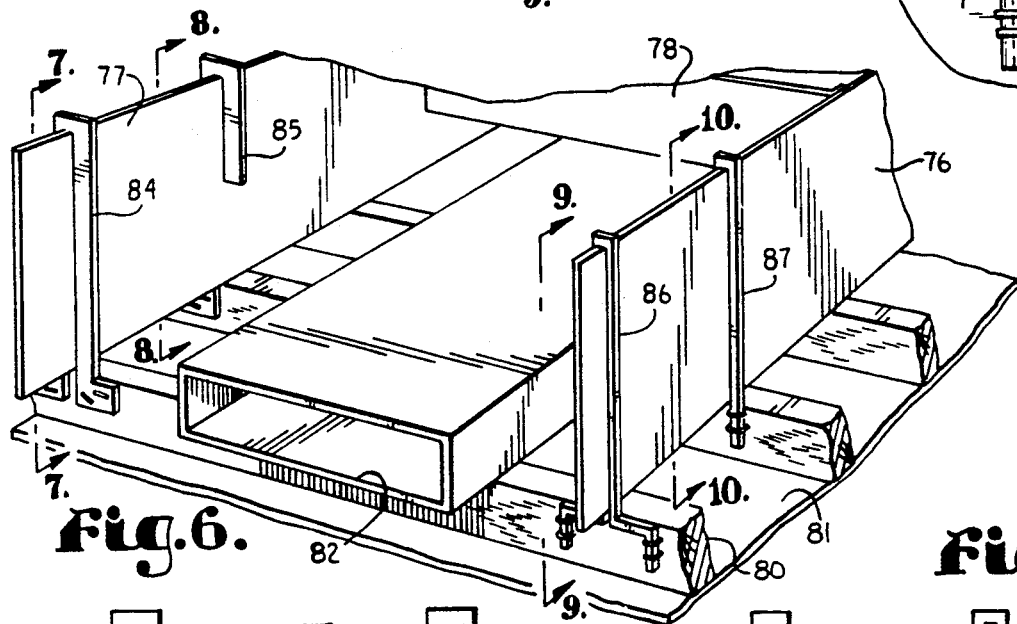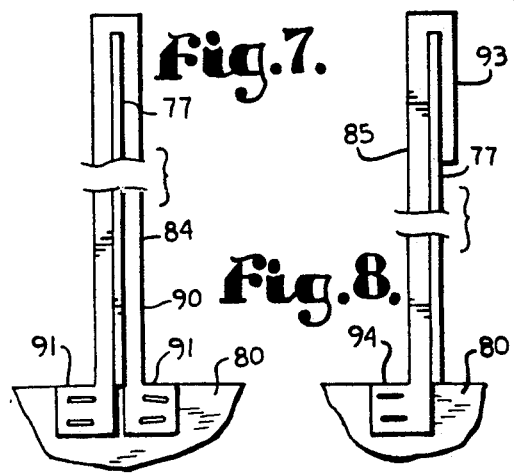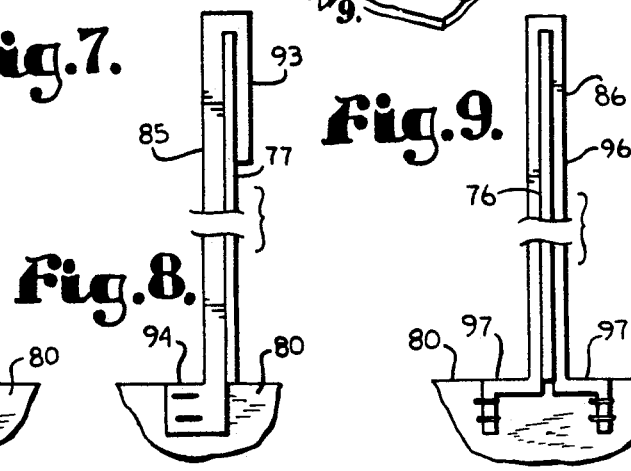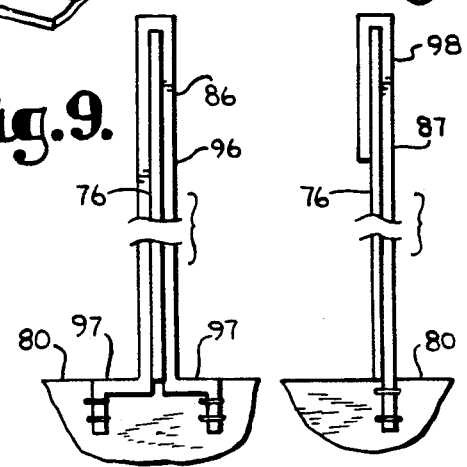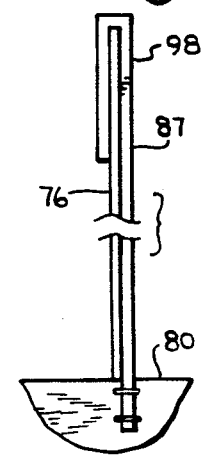

INSULATION CONTAINMENT APPARATUS

BACKGROUND OF THE INVENTION

The present invention is directed to a collapsed apparatus which can be readily expanded for placement about a ventilation duct in an attic or the like for containing insulation in a preferred configuration about the duct.

Because energy is becoming an increasingly scarce resource for both the heating and cooling of houses and similar structures and because such energy is becoming increasingly expensive, it is becoming increasingly important to insulate such structures in such a manner so as to prevent loss of any substantial amounts of heating and cooling to the ambient air. Current recommended insulation guidelines typically call for an insulating factor in the R30 to R38 range. An insulating factor of R38 effectively equates to approximately 12 inches of blown cellulose or fiberglass insulation. Consequently, most modern houses are constructed with approximately 12 inches of insulation within the attic structure above the ceiling of the top floor.

In addition to energy lost through walls and ceilings, there can also be a substantial loss of energy through the duct work which carries heating and/or cooling throughout a structure. In order to avoid such a loss, this duct work is often placed beneath the ceiling or between a lowered artificial ceiling and the attic in such a structure. Nevertheless, many structures do not have sufficient clearance to place the duct work in a protected location and even when the duct work can be placed below the ceiling, it is often aesthetically unpleasing.

Consequently, the duct work is often placed in the attic, especially when no basement is present to carry it. When such duct work is placed in an attic, it is usually placed over ceiling joists and is typically 6 inches or greater in diameter or thickness. Because part of the insulation in an attic is between the joist, only about 6½ inches of insulation will extend above the ceiling joists in an attic having an overall bed of 12 inches of insulation. If the duct work is 6 inches in thickness, this means that only approximately a half inch of insulation will cover the duct work. Consequently, it is desirable to also fully insulate the duct work that is run through the attic with a 12 inch layer of insulation.

While it is desirable to provide a full layer of insulation for the duct work, it would be prohibitively expensive to place an insulating blanket of sufficient thickness to provide 12 inches of insulation for the duct work throughout the entire attic and it may also make it difficult to work in the attic for people needing access thereto. Therefore, it is desirable to provide a structure that contains additional insulation in the region immediately surrounding the duct work so that the duct work can have a proper insulating cover without spreading the insulation in a uniform layer throughout the attic.

Structures for containing insulation in this manner have previously taken the form of a fixed wall which is constructed with material such as boards and plywood and nailed to the ceiling joists to form a trough for the insulation covering the duct work. While such a constructed wall is effective in maintaining the insulation, it has a major drawback in that it requires a substantial period of time, labor and materials to construct. Most insulators are interested in maintaining labor costs as low as possible and wish to quickly apply the appropriate insulation coating to an attic. Consequently, it is desirable to have a structure that is pre-made of relatively simple and inexpensive materials that can be quite readily expanded when placed in an attic to form the desired structure to surround the duct work and provide a containment for insulation covering the duct work.

SUMMARY OF THE INVENTION

A collapsed or unexpanded containment apparatus is provided for use in conjunction with the insulation of ventilation ducts in attics and the like wherein the apparatus is readily and quickly expandable to a usable position for holding or containing insulation in a surrounding relationship to the duct.

The apparatus comprises a pair of elongate flexible webs or side panels that are connected by a plurality of spaced members. Preferably, the apparatus is constructed of a cardboard type of material wherein the corrugation of the webs are generally vertically aligned to provide flexibility and allow bending about a vertical axis along the web. The corrugation of the spacing members is generally horizontally aligned so as to provide less flexibility and less likelihood of bending as compared to the outer panels. In this manner the overall apparatus can be accordianed by movement of the spacing members toward one another and inward flexure of the webs therebetween. Once the apparatus is completely accordianed, facing walls of the spacing members sandwich the outer webs so as to essentially touch one another and the overall size of the apparatus is relatively small. When expanded, as in use, the apparatus forms an elongate channel having a series of segmented compartments which can be filled to the top thereof with insulation.

The lower ends of each of the connecting members is shaped or provided with moveable flaps to allow the spacing members to rest or be positioned over a ventilation duct. During installation, the apparatus can be very quickly expanded to a fully expanded configuration thereof and positioned over a duct after which the apparatus is filled with insulation to provide suitable insulation for the duct. Preferably, the apparatus is sized and shaped so that when installed and filled with insulation, it provides the duct with a preselected insulation factor.

Stakes or stays are also provided for connecting unsupported ends or for securing the apparatus in place to a building structure associated with a ventilation duct to be covered thereby.

OBJECTS AND ADVANTAGES OF THE INVENTION

Therefore, the objects of the present invention are: to provide an insulation containment apparatus for holding insulation around and over a ventilation duct so as to provide a selected insulation factor for the ventilation duct; to provide such an apparatus which can be brought to a job site in a collapsed configuration and relatively quickly expanded to an expanded configuration suitable for use in conjunction with such a ventilation duct; to provide such an apparatus comprising a pair of elongate and flexible side panels joined together by a plurality of spaced members; to provide such an apparatus wherein the panels are relatively easily bent so as to fold therealong and relative to the spacing members so as to abut against the spacing members when in the collapsed configuration thereof and to thereby provide a compact form for the apparatus when in the collapsed configuration thereof; to provide such an apparatus with side panels which can be constructed of cardboard, plastic, screen or the like that are suitable for use in building construction and relatively inexpensive in cost; to provide such an apparatus which can be relatively quickly installed; to provide such an apparatus which can be treated to improve fire resistant properties thereof; to provide such an apparatus which is relatively easy to manufacture and inexpensive to produce; to provide a method of use of the apparatus which allows relatively quick and simple construction of a containment system for containing insulation around a duct within an attic or the like; and to provide such an apparatus and method that are particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a first modified embodiment of an insulation containment apparatus in accordance with the present invention shown in conjunction with an attic structure including a ventilation duct.

FIG. 5 is a fragmentary and enlarged side elevational view of the first modified insulation containment apparatus and attic structure, taken along line 5—5 of FIG. 4.

FIG. 6 is a perspective view of a second modified insulation containment apparatus in accordance with the present invention, shown in conjunction with an attic structure, including a ventilation duct.

FIG. 7 is an enlarged and fragmentary view of the second modified insulation containment apparatus and attic structure, taken along line 7—7 of FIG. 6.

FIG. 8 is a fragmentary and enlarged cross sectional view of the second modified insulation containment apparatus and attic structure, taken along line 8—8 of FIG. 6.

FIG. 9 is a fragmentary and enlarged cross sectional view of the second modified insulation containment apparatus and attic structure, taken along line 9—9 of FIG. 6.

FIG. 10 is a fragmentary and enlarged cross sectional view of the second modified insulation containment apparatus and attic structure, taken along line 10—10 of FIG. 6.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
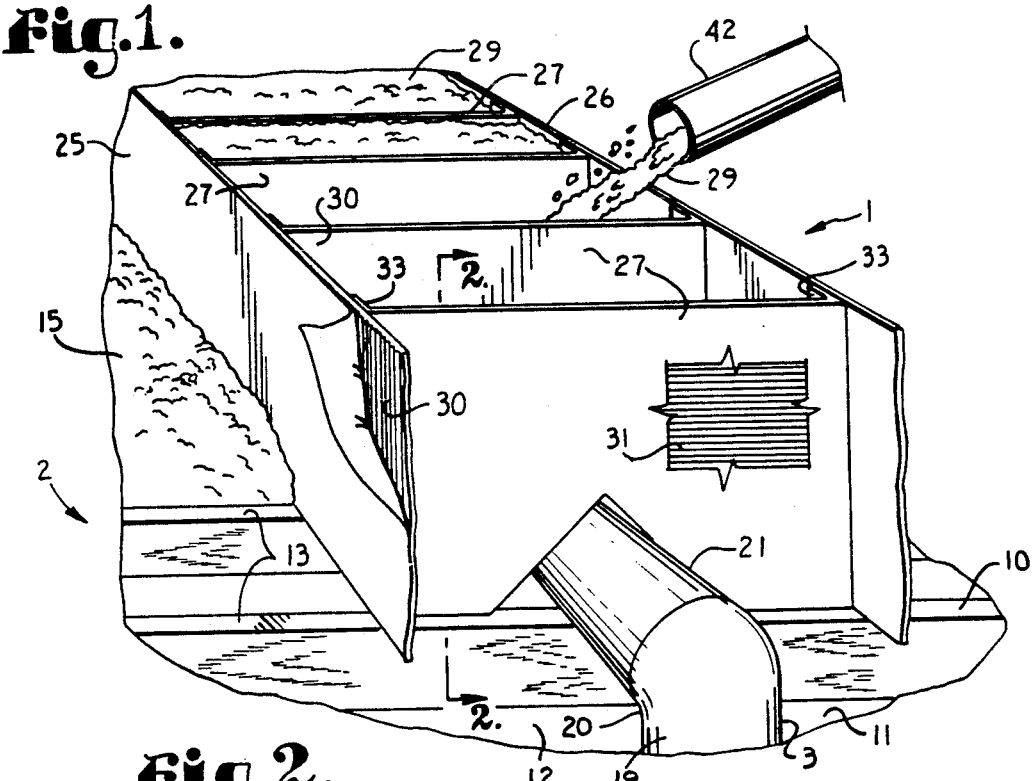
FIG. 1 is a fragmentary view of an insulation containment apparatus in accordance with the present invention shown positioned over a ventilation duct in an attic structure and being filed with insulation.
Figure 2:
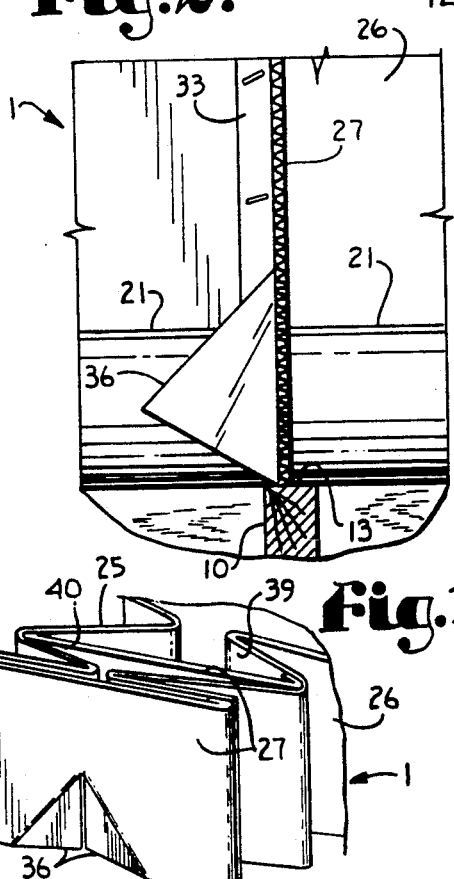
FIG. 2 is a fragmentary and enlarged cross sectional view of the insulation containment apparatus and attic structure, taken along line 2—2 of FIG. 1.
Figure 3:
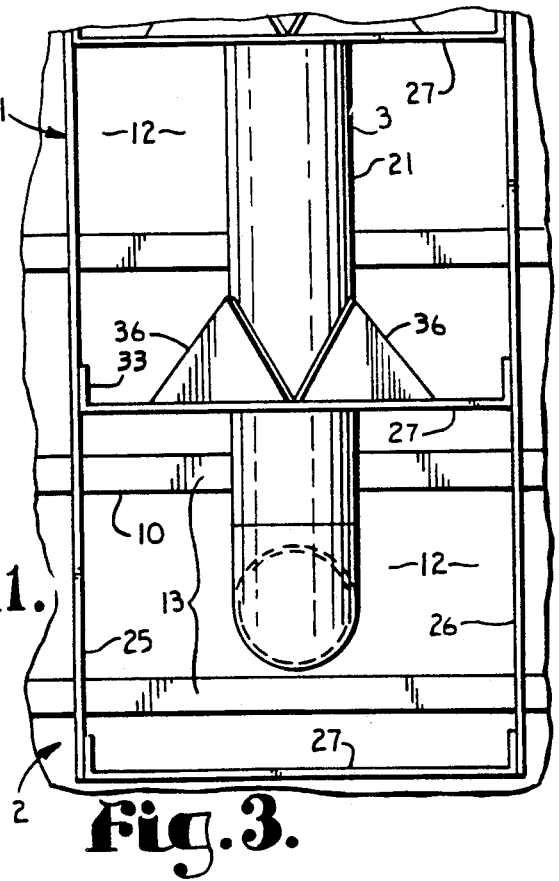
FIG. 3 is a fragmentary and enlarged top plan view of the insulation containment apparatus and attic structure.

The reference numeral 1 generally represents an insulation containment apparatus in accordance with the present invention which is shown in FIGS. 1 through 3 in a building attic 2 and covering a heating and air conditioning duct 3. The apparatus 1 is also shown in a semi compressed configuration in FIG. 11.

The attic 2 which is illustrated comprises a series of spaced and parallel wooden beams or ceiling joists 10 to which is attached a ceiling 11 of an upper floor of a structure supporting the attic 2. The joists 10 have top surfaces 13 supporting the duct 3. The ceiling 11 includes a layer of sheet rock 12. As is shown in FIG. 1, an insulation blanket 15 is being installed in the attic 2. The insulation blanket 15 is positioned on top of the sheet rock 12 and the joists 10 so that the insulation blanket 15, when completely installed, forms a generally uniform layer of insulation across the entire ceiling 11. Preferably the insulation blanket has an overall depth of at least 12 inches relative to the top of the sheet rock 12 and may be constructed of blown cellulose, fiber glass or the like. As ceiling joists, such as joists 10, are usually approximately 5½ inches in thickness, the insulation blanket 15 will extend above the tops of the ceiling joists 10 and, in particular, where the insulation blanket 15 is approximately 12 inches thick, the insulation blanket 15 will extend approximately 6½ inches above the joists 10.

The heating and air conditioning duct 3 is a conventional type of duct work utilized in houses and other types of building construction. The duct 3 is constructed of conventional 6 inch diameter aluminum tubing and is shown with a riser 19 coming through the ceiling 11 whereat the riser 19 connects with an elbow 20 which thereafter connects with an elongate relatively straight horizontal run 21. The duct run 21 is shown extending generally perpendicular to the joist 10 and rests on the top of the joist 10 so as to extend thereabove. In the embodiment illustrated in FIGS. 1 through 3 the duct run 21 extends approximately 6 inches above the ceiling joist 10. It is noted that in accordance with the present invention the containment apparatus 1 can be modified for different types of duct, for example square or rectangular duct. The containment apparatus 1 can also be modified in accordance with the present invention to accommodate duct having various widths and heights as will be discussed with respect to the embodiments illustrated below.

The insulation containment apparatus 1 includes a pair of side panels 25 and 26 joined by a plurality of spacer panels 27. The side panels 25 are elongate and planer. Preferably the side panels 25 are constructed so as to provide a desired height of insulation above a particular duct 3. The side panels 25 shown in FIG. 1 are approximately 18 inches tall to provide for 12 inches of insulation 29 on top of the duct run 21. It is foreseen that other sizes of side panels 25 could be utilized depending upon the desired insulation level or duct size.

The panels 25, when in use for containing insulation 29 rest upon the joist tops 13 in the attic 2. The side panels 25 are generally upright and are relatively flexible about a vertical axis passing therethrough. This flexibility is important for transport of the containment apparatus 1 as will be discussed below.

In the embodiment illustrated in FIG. 1 the side panels 25 are highly flexible and constructed of a relatively thick cardboard. The cardboard of the side panels 25 has corrugations 30 which are aligned to be generally vertical to make the side panels more flexible about a vertical axis. While the illustrated embodiment utilizes cardboard for the purpose of constructing the side panels 25, it is foreseen that other materials of construction such as screen mesh or plastic could be utilized for this purpose.

Generally, the side panels 25 should be light weight and relatively long lived in a attic environment. When the side panels 25 are constructed of cardboard or other flammable material, the panels 25 may be treated with a fire retardant to reduce likelihood of combustion.

The spacer panels 27 are mainly provided to maintain a fixed spacing between the side panels 25 and to help support the side panels 25. Normally the spacer panels 27 will be joined to the side panels 25 at equal spacings therealong so as to provide generally equally sized compartments 30 positioned between and along the side panels 25.

The spacer panels 27 may be the same height as the side panels 25, as is shown in FIG. 1, so as to provide additional support for the apparatus 1. However, it is also foreseen that the spacer panels 27 may be of a different height relative to the side panels 25, as is shown different embodiments below, or may be segmented. Preferably the side panels 25 are of such a construction as to not readily bend along a vertical axis and thereby provide greater support to the side panels 25 when in use. In the embodiment illustrated in FIG. 1 the spacer panels 25 are constructed of cardboard having corrugations 31 which are aligned generally horizontally so as to help resist flexure about a vertical axis.

The spacer panels 27 are joined to the side panels 25 by suitable means such as gluing, stapling or the like. In the embodiment shown in FIG. 1 the spacer panels 27 each include a flange portion 33 on opposite sides thereof which mate with the side panels 25 and are glued thereto.

The lower side of each of the spacer panels is sized and shaped or designed with foldwawy portions in order to be received over duct work, such as the illustrated duct 3. In the embodiment illustrated in FIGS. 1 through 3 the lower side is vertually at the center of each of the spacer panels 27 so as to form a pair of flaps 36 which can be rotated outwardly to allow clearance of the duct 3, such as is shown in FIG. 3. It is noted that the side panels 25 can be precut to a specific size to allow for a rectangularly opening or the like. The side panels 25 can also be sized so as not to extend below the position of the duct or may simply be constructed of a material such as cardboard which can be easily cut with a knife to a selected size or shape by an installer. Preferably the spacer panels 27 are precut, as shown, to speed installation of the apparatus 1.

Figure 11:
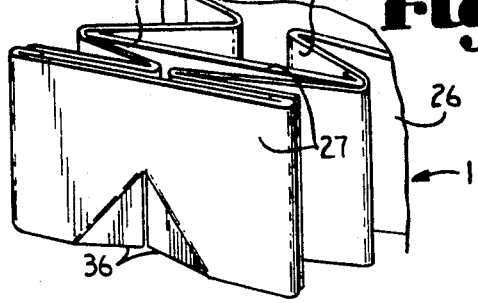
FIG. 11 is a fragmentary perspective view on a reduced scale of the insulation containment apparatus shown in FIG. 1 in a partially collapsed configuration thereof.

Shown in FIG. 11 is the containment apparatus in an accordianed or partially compressed state. The apparatus 1 shown in FIG. 11 is at a stage where a user or installer is starting to expand the apparatus 1 for use and the rearward compartment 39 is partially expanded whereas the frontward compartment 40 is almost completely compressed with only a slight amount of expansion shown. During transport or storage, the apparatus 1 would be completely compressed with the side panels 25 bent or folded at vertical mid lines between the spacer panels 27 and pushed inwardly, as is shown in FIG. 11, so as to snugly abut against the sides of the spacer panels 27.

In the compressed configuration the apparatus 1 takes up relatively little space and can be easily moved about by an installer. Where the materials of construction of the apparatus 1 have some degree of memory or resiliency, a string or other type of band may be utilized to wrap around the apparatus 1 in the compressed configuration to maintain that configuration. When ready for use the apparatus 1 is allowed to expand as is shown in FIG. 1 and positioned over a duct 3. Likewise, as is shown in FIG. 1 the various compartments 30 of the apparatus 1 are filled with insulation 29 such as the blown insulation 41 from the tube 42 attached to a conventional insulation blowing apparatus (not shown). This apparatus can be constructed in various preselected lengths (for example, 20 feet) and trimmed by use of a utility knife to a desired length.

Illustrated in FIGS. 4 and 5 is a second embodiment of an insulation containment apparatus according to the present invention generally represented by the reference numeral 50. The apparatus 50 is in many respects similar to the apparatus 1 and discription of common features will not be repeated in detail herein. The apparatus 50 includes a pair of elongate side panels 52 and 53 spaced by a plurality of spacer panels 54 having a generally equal spacing along the sides of the side panels 52 and 53. The spacer panels 54 are attached at opposite sides thereof to the side panels 52 and 53 and extend from an intermediate vertical location along the side panels 52 and 53 to the tops of the side panels 52 and 53. The apparatus 50 is shown in an attic structure 56 positioned on a series of equally spaced ceiling joists 57. Running between the side panels 52 and 53 and beneath the spacer panels 54 is a rectangular shaped heating and ventilation duct 59 supporting the spacer panels 54. The apparatus 50 forms compartments 60 about the duct 59 to hold insulation (not shown), as is illustrated with respect to the apparatus 1.

Because of the configuration of certain attics or because it is desirable to secure the apparatus 50 in a fixed location for certain reasons, a stake 62 is provided. The stake 62 includes a base 63 and a fork section 64. When in use, as illustrated in FIGS. 4 and 5, the stake 62 is stapled at the base 63 to one of the floor joists 57. One of the side panels, here side panel 52, is inserted in the fork section 64. In use the apparatus 50 is filled with insulation to the top thereof to insulate the duct 59 as has been described for the previous embodiment.

FIGS. 6 through 10 illustrate a third embodiment of a insulation containment apparatus in accordance with the present invention that is generally represented by the reference numeral 75. The apparatus 75 is similar in many respects to the apparatus 50 or 1 and, therefore, only major differences will be described herein. In particular, the apparatus 75 includes a pair of side panels 76 and 77 spaced by a plurality of intermediate or spacer panels 78.

The apparatus 75, when installed, rests upon floor joists 80 supporting a ceiling 81 thereneath and supporting a heating and ventilation duct 82 thereabove. The apparatus 75 has side panels 76 and 77 and intermediate spacing panels 78 which are similar to those of the previous embodiment. Again, where it is desirable to support the end of a run of the apparatus 75 that may have, for example attic structure otherwise blocking support for the structure, braces 84, 85, 86 and 87 are utilized. The braces 84 through 87 can also be utilized to secure the apparatus 75 in a fixed location, if there is problem with movement due to slope of the joists 80 or due to other factors. The brace 84 is illustrated in FIG. 7 and includes a U-shaped structure 90 with base feet 91 on either side thereof. The feet 91 are stapled to a joist 80 and a portion of the side panel 77 is captured within the U-shaped upright portion 90 of the brace 84.

Shown in FIG. 8 is a detailed view of the brace 85 which is otherwise similar to the brace 84 with a portion thereof removed to form a J-shaped upright structure 93 having a foot 94. The foot 94 is stapled to a joist 80 while the J-shaped structure 93 partially encircles the side panel 77 so as to provide support thereto.

The brace 86 likewise includes a U-shaped portion 96 which encircles the side panel 76 and which has two lower L-shaped feet 97. The L-shaped feet 97 are secured by stapling or the like to the joist 80.

The brace 87 includes an upper J-shaped segment 98 and a lower foot 99. The foot 99 is secured by stapling or the like to the joist 80, while the upper J-shaped segment 98 partially encircles the side panel 77 so as to support the side panel 77. The braces 86 and 87 are constructed of wood or metal whereas braces 84 and 85 are constructed of cardboard or similar material.

It is to be understood that while certain forms of the present invention have been illustrated and described herein, it is not to be limited to the specific forms or arrangement of parts described and shown.

What is claimed and desired to be secured by Letters Patent is as follows:

1. An insulation containment apparatus for insulating duct work, said apparatus comprising:
  (a) a plurality of elongate sides grouped in pairs;
  (b) a plurality of spacer panels;
  (c) means for connecting opposite ends of each spacer panel to one end of one of said pairs of sides;
  (d) said containment apparatus having a transport configuration wherein each of said sides is folded adjacent a respective spacer panel and a containment configuration wherein said sides and said spacer panels are aligned to form a rectangular containment area therebetween; and
  (e) structural means located on the lower end of at least one of said spacer panels to allow for passage of the duct work therethrough.

2. The apparatus according to claim 1 including:
  (a) means for connecting a second end of each of the pairs of sides to one another to form elongate side panels such that a plurality of side by side rectangular containment areas are formed.

3. The apparatus according to claim 1 wherein:
  (a) said structural means are slits in said spacer panels to provide for flaps therein to allow for passage of the cut work therethrough.

4. The apparatus according to claim 1 wherein:
  (a) said side panels are constructed of cardboard having corrugations that are vertically aligned during use to allow easy folding thereof.

5. The apparatus according to claim 4 wherein:
  (a) said spacer panels are constructed of cardboard having corrugations that are horizontally aligned during use.

6. The apparatus according to claim 1 wherein:
  (a) said spacer panels are substantially the same height as said side panels.

7. The apparatus according to claim 1 wherein:
  (a) said spacer panels are of substantially less height than said side panels thereby forming said structural means to allow passage therebeneath for the duct work.

8. The apparatus according to claim 1 including:
  (a) a stake having an end adapted to be secured to a joist and at least partially encircling one of said side panels so as to secure said apparatus in place relative to the joist at that location.

9. An insulation containment apparatus for insulating duct work comprising:
  (a) a pair of elongate flexible side panels;
  (b) a plurality of spacer panels; each of said spacer panels being attached at opposite ends thereof to said panels at spaced locations therealong so as to form at multiple side by side compartments for containing insulation between said side panels; and
  (c) said apparatus has a first unexpanded configuration wherein said side panels are accordianed such that sides of said side panels generally abut against said spacer panels and an expanded configuration wherein said side panels are aligned approximately perpendicularly to said spacer panels, such that said multiple side by side compartments can be operatively placed over and along the duct work.

10. A method of insulating about a duct in an attic comprising the steps of:
  (a) preforming an insulation containment apparatus having a pair of side panels connected together by a plurality of spacer panels;
  (b) accordianing said apparatus;
  (c) transporting said apparatus to the site of said duct;
  (d) expanding said apparatus to form at least one compartment between said side panels;
  (e) placing said compartment over said duct; and
  (f) filling said compartment with insulation.

11. An insulation containment apparatus for insulating duct work comprising:
  (a) a pair of elongate flexible side panels;
  (b) a plurality of spacer panels; each of said spacer panels being attached at opposite ends thereof to said panels at spaced locations therealong so as to form at least one compartment for containing insulation between said side panels; and wherein
  (c) said spacer panels are slit to provide for flaps therein to allow for passage of the duct work therethrough.

12. An insulation containment apparatus for insulating duct work comprising:
  (a) a pair of elongate flexible side panels;
  (b) a plurality of spacer panels; each of said spacer panels being attached at opposite ends thereof to said panels at spaced locations therealong so as to form at least one compartment for containing insulation between said side panels; and
  (c) said spacer panels are of substantially less height than said side panels forming a passage therebeneath for the duct work.

13. An insulation containment apparatus for insulating duct work comprising:
  (a) a pair of elongate flexible side panels;

(b) a plurality of spacer panels; each of said spacer panels being attached at opposite ends thereof to said panels at spaced locations therealong so as to form at least one compartment for containing insulation between said side panels; and (c) a stake having an end adapted to be secured to a joist and at least partially encircling one of said side panels so as to secure said apparatus in place relative to the joist at that location.

* * * * *